US008713037B2

(12) United States Patent
Nikoulina et al.

(10) Patent No.: US 8,713,037 B2
(45) Date of Patent: Apr. 29, 2014

(54) TRANSLATION SYSTEM ADAPTED FOR QUERY TRANSLATION VIA A RERANKING FRAMEWORK

(75) Inventors: Vassilina Nikoulina, Grenoble (FR); Nikolaos Lagos, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 158 days.

(21) Appl. No.: 13/173,582

(22) Filed: Jun. 30, 2011

(65) Prior Publication Data
US 2013/0006954 A1    Jan. 3, 2013

(51) Int. Cl.
*G06F 17/30* (2006.01)

(52) U.S. Cl.
USPC ........................................... 707/760

(58) Field of Classification Search
CPC .............................. G06F 17/30427
USPC ........................................... 707/760
See application file for complete search history.

(56) References Cited

U.S. PATENT DOCUMENTS

| | | | |
|---|---|---|---|
| 6,182,026 B1* | 1/2001 | Tillmann et al. | 704/2 |
| 7,454,326 B2* | 11/2008 | Marcu et al. | 704/2 |
| 7,624,005 B2* | 11/2009 | Koehn et al. | 704/2 |
| 7,689,412 B2 | 3/2010 | Wu et al. | |
| 7,860,706 B2 | 12/2010 | Abir | |
| 8,234,106 B2 | 7/2012 | Marcu et al. | |
| 2003/0217052 A1* | 11/2003 | Rubenczyk et al. | 707/3 |
| 2004/0122656 A1 | 6/2004 | Abir | |
| 2004/0267760 A1* | 12/2004 | Brundage et al. | 707/100 |
| 2006/0190241 A1* | 8/2006 | Goutte et al. | 704/2 |
| 2007/0150257 A1* | 6/2007 | Cancedda et al. | 704/2 |
| 2007/0265825 A1* | 11/2007 | Cancedda et al. | 704/2 |
| 2008/0126074 A1* | 5/2008 | Whitelock et al. | 704/2 |
| 2008/0235202 A1* | 9/2008 | Wang et al. | 707/4 |
| 2008/0262826 A1* | 10/2008 | Pacull | 704/3 |
| 2008/0288474 A1 | 11/2008 | Chin et al. | |
| 2008/0300857 A1* | 12/2008 | Barbaiani et al. | 704/4 |
| 2009/0024613 A1* | 1/2009 | Niu et al. | 707/5 |
| 2009/0182547 A1 | 7/2009 | Niu et al. | |
| 2009/0222437 A1* | 9/2009 | Niu et al. | 707/5 |
| 2009/0326914 A1* | 12/2009 | Joy et al. | 704/3 |
| 2011/0320187 A1* | 12/2011 | Motik et al. | 704/9 |

OTHER PUBLICATIONS

Zhongguang Zheng; Zhongjun He; Yao Meng; Hao Yu; , "Domain adaptation for statistical machine translation in development corpus selection," Universal Communication Symposium (IUCS), 2010 4th International, pp. 2-7, Oct. 18-19, 2010.*

Berger, et al. "The Weaver system for document retrieval," in Proceedings of the 8th Text Retrieval Conference, NIST 1999, pp. 163-174.

(Continued)

*Primary Examiner* — Rehana Perveen
*Assistant Examiner* — Mark E Hershley
(74) *Attorney, Agent, or Firm* — Fay Sharpe LLP

(57) ABSTRACT

A system and method suited to translation of queries are disclosed. The method includes receiving an input query in a source language and outputting a target query, based on a translation of the input query into a target language, different from the source language. The translation is performed with a machine translation system which has been trained on representations of features of translated queries that have been generated by translation of an original query, in the source language, into the target language and a measure of information retrieval performance of each the translated queries, for each of a set of original queries.

24 Claims, 6 Drawing Sheets

(56) References Cited

OTHER PUBLICATIONS

Bergsma, et al. "Learning Noun Phrase Query Segmentation," in *Proceedings of the 2007 Joint Conference on Empirical Methods in Natural Language Processing and Computational Natural Language Learning*, Prague, Jun. 2007, pp. 819-826.
Chiang, et al. "Online large-margin training of syntactic and structural translation features," in *Proceedings of the Conference on Empirical Methods in Natural Language Processing* (EMNLP '08). Association for Computational Linguistics, 2008, pp. 224-233.
U.S. Appl. No. 12/690,504, Jan. 1, 2010, Stymne, et al.
U.S. Appl. No. 12/814,657, Jun. 14, 2010, Hanneman, et al.
U.S. Appl. No. 12/911,252, Oct. 25, 2010, Roth, et al.
Collins, et al. "Discriminative syntactic language modeling for speech recognition," in *Proceedings of the 43rd Annual Meeting on Association for Computational Linguistics* (ACL '05), pp. 507-514, 2005.
Crammer, et al. "Ultraconservative online algorithms for multiclass problems," in *Journal of Machine Learning Research* , 3:951-991, 2008.
Ferro, et al. "Ad Hoc Track Overview: TEL and Persian Tasks," CLEF 2009, pp. 13-35.
Gao, et al. "A study of statistical models for query translation: finding a good unit of translation," in *Proceedings of the 29th annual international ACM SIGIR conference on Research and development in information retrieval*, 2006, pp. 194-201.
Hiemstra, et al. "Disambiguation Strategies for Cross-Language Information Retrieval," in *Proceedings of the Third European Conference on Research and Advanced Technology for Digital Libraries* , Serge Abiteboul and Anne-Marie Vercoustre (Eds.). Springer-Verlag, 1999, pp. 274-293.
Hiemstra, et al. "Translation Resources, Merging Strategies, and Relevance Feedback for Cross-Language Information Retrieval," in *Revised Papers from the Workshop of Cross-Language Evaluation Forum on Cross-Language Information Retrieval and Evaluation* (CLEF '00), Carol Peters (Ed.). Springer-Verlag, 2000, pp. 102-115.
Kraaij,et al. "Embedding web-based statistical translation models in cross-language information retrieval," *Comput. Linguist.* 29, 3, Sep. 2003, pp. 381-419.
McNamee, et al. "A Language-Independent Approach to European Text Retrieval," in *Revised Papers from the Workshop of Cross-Language Evaluation Forum on Cross-Language Information Retrieval and Evaluation* (CLEF '00), Carol Peters (Ed.). Springer-Verlag, 2000, pp. 129-139.
Nie, J.Y. "Cross-Language Information Retrieval. in: Synthesis Lectures in Human Language Technologies," Ed(s). Hirst, G., Morgan & Claypool Publishers, 2010.
Och, et al. "A Systematic Comparison of Various Statistical Alignment Models," *Computational Linguistics*,29(1), 2003, pp. 19-51.
Och, et al. "Syntax for Statistical Machine Translation : Final report of John Hopkins 2003 Summer Workshop," Technical report, John Hopkins University, 2003.
Nikoulina, et al. "Experiments in discriminating phrase-based translations on the basis of syntactic coupling features," in *Proceedings of the Second Workshop on Syntax and Structure in Statistical Translation* (SSST '08), David Chiang and Dekai Wu (Eds.). Association for Computational Linguistics, 2008, pp. 55-60.
Collins. "Discriminative training methods for hidden Markov models: theory and experiments with perceptron algorithms," in *Proceedings of the ACL-02 conference on Empirical methods in natural language processing*—vol. 10 (EMNLP '02), 2005.

* cited by examiner

TRANSLATION SYSTEM ADAPTED FOR QUERY TRANSLATION VIA A RERANKING FRAMEWORK

BACKGROUND

Aspects of the exemplary embodiment disclosed herein relate to a system and method for translation of a query which finds particular application in information retrieval.

Cross-Lingual Information Retrieval (CLIR) systems for retrieving documents in one language based on a query input in another language could provide useful tools, particularly when the domain of interest is largely in a different language from that of an information searcher. The input query is first translated, using an automatic machine translation system, into the language used in the documents and then input to a search engine for querying a document collection.

One problem which arises is that Statistical Machine Translation (SMT) systems designed for general text translation tend to perform poorly when used for query translation. SMT systems are often trained on a corpus of parallel sentences, which have been automatically extracted from a parallel corpus of documents. The documents in the corpus are assumed to be translations of each other, at least in the source to target direction. The trained SMT systems thus implicitly take into account the phrase structure. However, the structure of queries can be very different from the standard phrase structure used in general text: Queries are often very short and the word order can be different from the typical full phrase which would be used in general text. Having a large number of parallel queries would enable training an SMT system adapted to translation of queries. However, no such corpora are available.

Moreover, even if such training data were to be made available, current SMT systems are usually trained to optimize the quality of the translation (e.g., using the BLEU score for assessing the quality of the translations output by the Moses phrase-based SMT system). This means that for a typical task related to query translation, such as Cross-Lingual Information Retrieval (CLIR) the optimization function used is not correlated with the retrieval quality. For example, the word order which is crucial for good translation quality (and is taken into account by most MT evaluation metrics) is often ignored by IR models.

Conventional CLIR systems often employ components for query translation, document indexing, and document retrieval. While the translation is often considered independently from the retrieval component, several attempts have been made to bring them together. For example, a probabilistic model embeds the query translation step into the retrieval model. See, for example, Hiemstra, D. and de Jong, F., "Disambiguation Strategies for Cross-Language Information Retrieval, ECDL 1999, pp. 274-293. However, this approach requires access to a document index, which is not feasible in the context of a translation service, where the collection to be searched is often unknown.

The exemplary embodiment addresses these problems, and others, by integrating IR metrics into a machine translation system by using a reranking framework.

BRIEF DESCRIPTION

In accordance with one aspect of the exemplary embodiment, a translation method includes receiving an input query in a source language and outputting a target query. The target query is based on a translation of the input query into a target language, different from the source language, with a machine translation system. The machine translation system has been trained, for each of a set of original queries, on representations of features of translated queries and a respective measure of information retrieval performance. The translated queries are each generated by translation of one of the original queries in the source language into the target language. The measure of information retrieval performance of each the translated queries can be determined with respect to the original query, either directly, or with reference to a separate translation thereof.

In another aspect, a query translation system includes a decoder which receives a source query in a source language and outputs a set of candidate queries in a target language, each of the candidate queries being a translation of the same source query. A reranking module outputs a target query based on at least one of the candidate queries. The reranking module extracts features of each of the candidate queries and computes a function in which the extracted features are weighted by feature weights. The feature weights have been learned on features of each of a set of translated queries generated by translation of an original query into the target language and a measure of information retrieval performance, for each original query in a set of original queries of each the translated queries with respect to the original query, either directly, or with reference to a separate translation thereof.

In another aspect, a method for training a translation system for translation of queries includes, for each of a set of original queries in a source language, translating the query to generate a set of translations in a target language and, for each translation in the set of translations, extracting values of features for each of a finite set of features and obtaining a measure of retrieval performance, for each translation, with respect to the original query, either directly, or with reference to a separate translation thereof. Feature weights are learned for each of the features based on the extracted values of the features and the respective measure of retrieval performance of each translation. The feature weights are stored for use in translating a new query, different from each of the original queries, from the source language to the target language. Candidate translations of the new query are able to be ranked based on their extracted values of features and the stored feature weights.

DETAILED DESCRIPTION

Aspects of the exemplary embodiment relate to a system and method for translation of queries which rerank translated queries using feature weights trained on translations of queries and the relevance (to the respective input query) of information (e.g., documents) retrieved by them.

A query, as used herein, includes a text string, such as a phrase or a sentence, often comprising only a few words, generally of ten words or less, which is used to retrieve responsive documents from a document collection. The documents retrieved generally include text documents in a natural language. In the exemplary embodiment, the optimization objective function of SMT systems is optimized based on information retrieval (IR) metrics via a reranking framework.

A document, as used herein can be any stored text in a natural language, such as an entire stored document or portion thereof. Some documents may include images as well as text. A document can thus be any one or more of a text file, PDF, XML, or other structured or semi-structured document, an image or a video/audio file, with a short description in natural language, or the like, from which a text string can be extracted.

Figure 1:
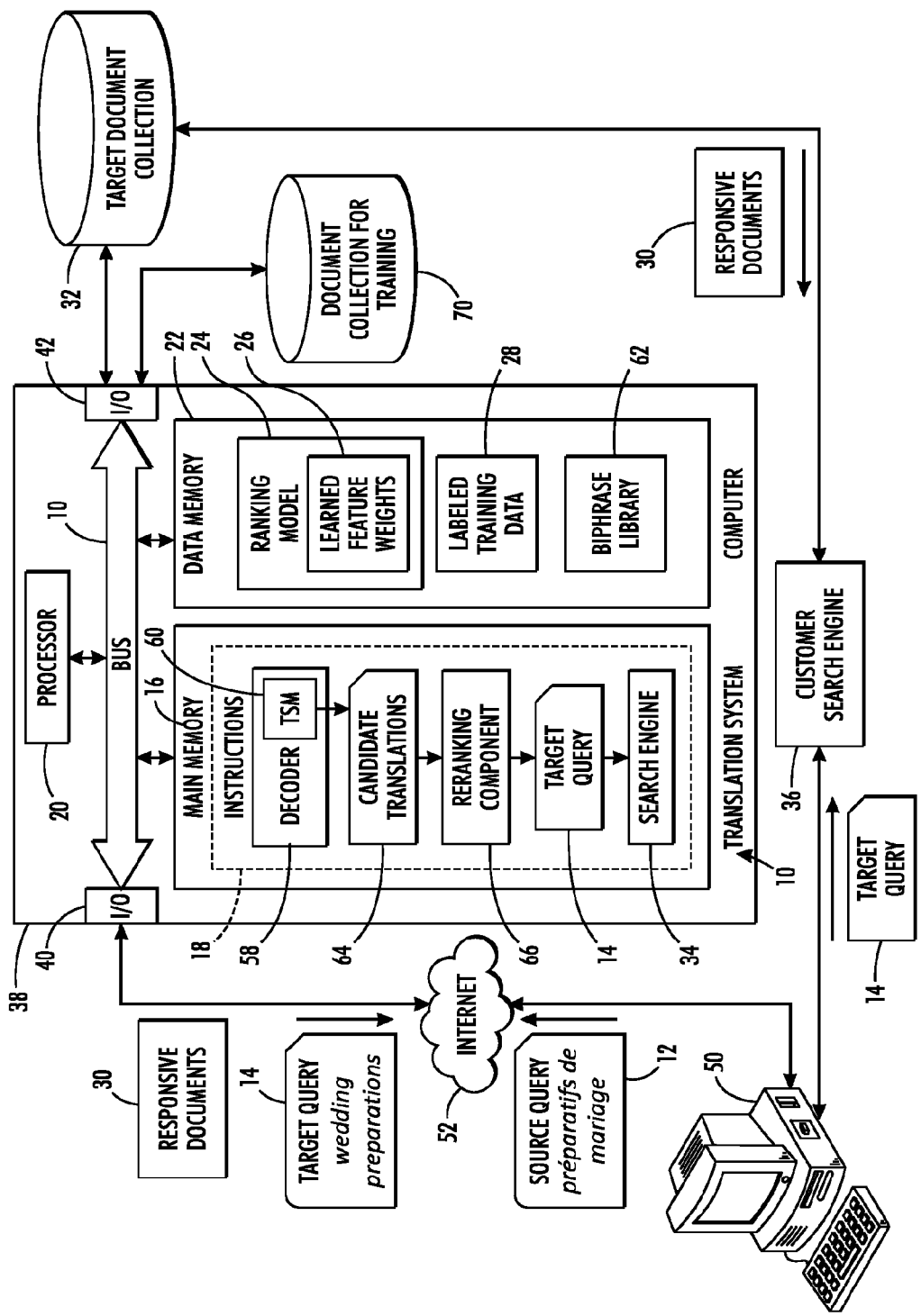
FIG. 1 is a functional block diagram of an environment in which an exemplary system for query translation operates in accordance with one aspect of the exemplary embodiment.

FIG. 1 illustrates an exemplary query translation system 10 in accordance with one aspect of the exemplary embodiment. The system 10 is adapted to receiving an input query (source query) 12 in a first natural language (source language), such as French, and outputting an output query (target query) 14 in a second natural language (target language) different from the first natural language, such as English (in the example). The system includes main memory 16 which stores instructions 18 for performing the exemplary method(s) described herein and a processor 20 in communication with the memory 16 for executing the instructions. Data memory 22, which may be separate from or integral with the main memory 16, stores a reranking model 24 which includes a set of feature weights 26 which have been learned on training data 28. The exemplary training data 28 includes features of target queries and corresponding relevance scores of the documents retrieved with them. Once the weights 26 have been learned, the training data 28 can be omitted from the system. The output query 14 can be used for retrieving responsive documents 30 from a document collection 32, e.g., by a search engine 34 stored locally, e.g., in memory 16, or by a search engine 36 stored remotely, to which the system 10 has no access.

The exemplary translation system 10 is resident on one or more computing devices 38 and includes one or more input/output devices 40, 42 for communicating with external devices. Hardware components 16, 20, 22, 40, 42 of the system 10 may be communicatively linked via a data/control bus 44.

The input query 12 can be input to the system 10 in any suitable form, e.g., from a client device 50, connected with the system via a wired or wireless link 52, such as a wired connection, local area network, or wide area network, such as the Internet. In other embodiments, the query is input to the system from a memory storage device, such as a disk or memory stick, or is generated within the system 10, itself.

The system 10 includes, e.g., stored in memory 16, or accesses from remote memory, a decoder 58, as is conventionally used in a phrase-based statistical machine translation (SMT) system with a translation scoring module (TSM) 60. The SMT system 58 has access to a biphrase library 62 which stores source-target phrase pairs. Using biphrases extracted by the biphrase library in combinations scored by the TSM 60, the decoder 58 outputs a set 64 of candidate translations of the query 12 in the target language, which are input to a reranking component 66. The candidate translations 64 of the input query 12 are referred to herein as candidate queries. The reranking component 66 ranks the set of candidate queries 64, based on their predicted retrieval performances. This is performed with the trained model 24 (incorporating the previously learned feature weights 26) and features extracted based on the candidate queries 64. The ranking is performed to find an optimal one or set of optimal translations from among the candidate queries 64. The reranking component 66 outputs a target query 14 based on one or more of the optimal candidate queries 64, e.g., to the search engine 34 or to an external device, such as client device 50. The target query 14 may thus be a single optimal one of the candidate queries 64 or a combination (e.g., concatenation) of two or more of the candidate queries 64. The exemplary reranking component 66 may be incorporated into the decoder 58 or be a separate component.

The computer system 38 may be a PC, such as a desktop, a laptop, palmtop computer, portable digital assistant (PDA), server computer, cellular telephone, tablet computer, pager, combination thereof, or other computing device capable of executing instructions for performing the exemplary method. In some cases, software components may be wholly or partly resident on the client computing device. Client device 50 may be configured similarly to the computer system 38, i.e., with memory, a processor, and one or more interfaces for communicating with external devices.

The memory 16, 22 may represent any type of non-transitory computer readable medium such as random access memory (RAM), read only memory (ROM), magnetic disk or tape, optical disk, flash memory, or holographic memory. In one embodiment, the memory 16, 22 comprises a combination of random access memory and read only memory. Memory 16, 22 stores instructions for performing the exemplary method as well as the processed data. In some embodiments, the processor 20 and memory 16 and/or 22 may be combined in a single chip. The exemplary network interface 40, 42 allows the computer to communicate with other devices via a computer network and may comprise a modulator/demodulator (MODEM).

The digital processor 20 can be variously embodied, such as by a single-core processor, a dual-core processor (or more generally by a multiple-core processor), a digital processor and cooperating math coprocessor, a digital controller, or the like. The digital processor 20, in addition to controlling the operation of the computer 38, executes instructions stored in memory 16 for performing the method outlined in FIGS. 2 and 3.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 2:
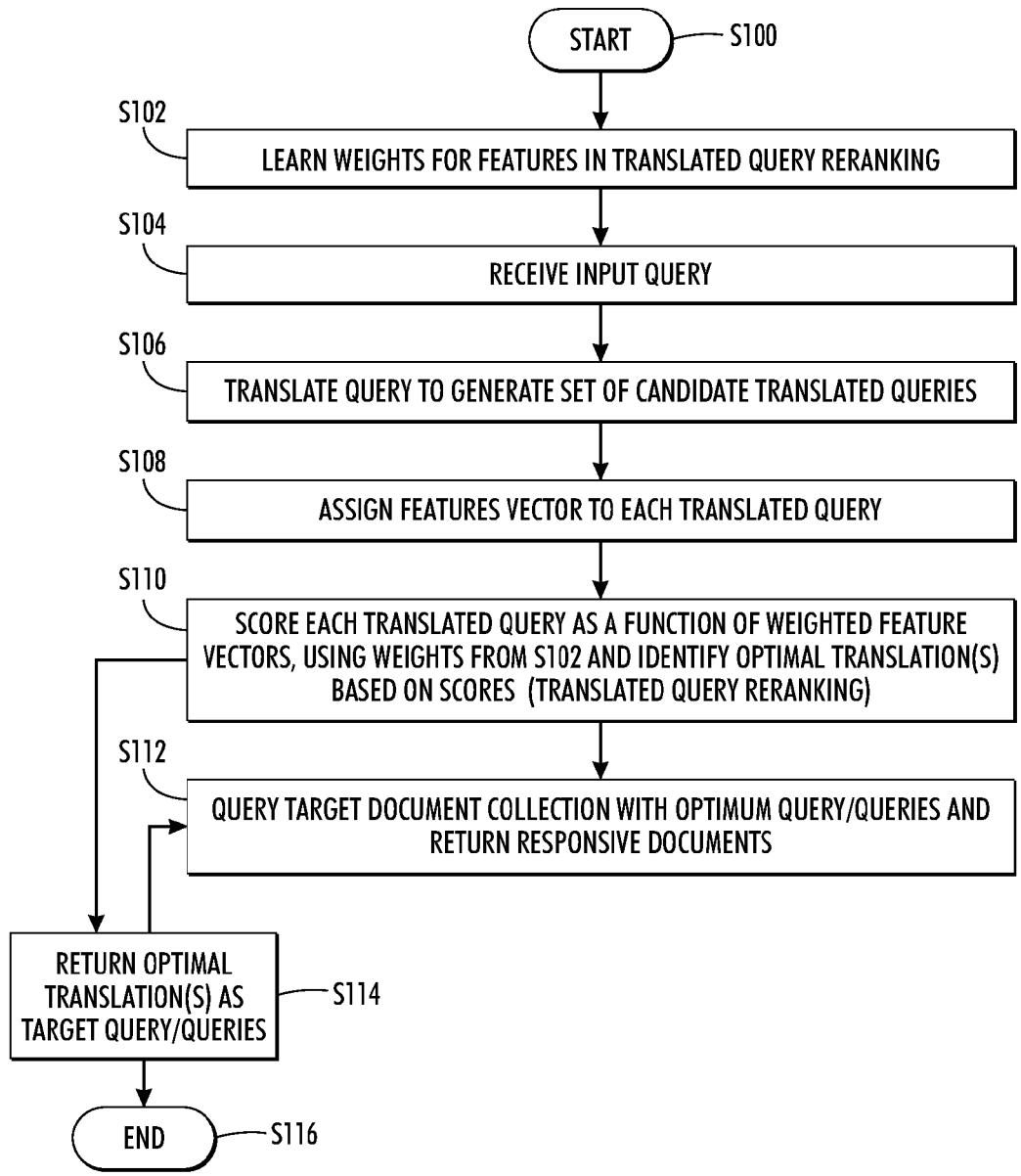
FIG. 2 is a flow chart illustrating a method for query translation in accordance with another aspect of the exemplary embodiment.

FIG. 2 illustrates steps of the exemplary method. The method begins at S100.

At S102, feature weights 26 for each of a set of two or more (generally at least 10 or more) features for a finite set of features are learned. The learning uses training data 28 in which translated queries in the target language are associated with a measure of their information retrieval performance (e.g., retrieval scores). In the exemplary embodiment, retrieval performance is based on the relevance, to the original source language query, of a set of documents retrieved in response to the translated query.

At S104, a new query 12 is received from a user in the source language.

At S106, the query 12 is translated with the decoder 58 to produce a set of candidate queries 64 in the target language.

At S108, a feature representation F(t), such as a features vector which represents a value for each of the set of features in the finite set of features, is assigned to each translation t in the set 64 of candidate queries.

At S110, an optimal translation $\hat{t}$ (or optimal set of translations) is chosen from the set 64 of candidate queries, by identifying the translation (candidate query) $t_i$ which provides the highest translation score, based on a scoring function for the respective features vector, using the weights determined in S102.

In the exemplary embodiment, the optimum translation is the one which maximizes the translation score, over all translations $t_i$ in set 64. The translation score can be defined as a weighted linear combination of the values of the features $F(t_i)$:

$$\hat{t} = \mathrm{argmax}_{t_i \in GEN(q)} \Lambda \cdot F(t_i) \qquad \text{(Eqn. 1)}$$

where $t_i \in (GEN(q))$ represents a candidate query generated from a source query q and $\Lambda$ represents the set of feature weights, one weight for each of the features in $F(t_i)$ and $\cdot$ represents the dot product.

In the exemplary embodiment, the feature weights $\Lambda$ are learned (in S102) to optimize an overall measure of retrieval performance, such as the Retrieval Mean Average Precision (MAP) on the training set 26 over all training queries in the source language, as described in greater detail below with respect to FIG. 3.

At S112, the optimal translation $\hat{t}$ (or set of translations) output at S110 is/are optionally used as query 14 to query a document collection 32 to retrieve responsive documents, some or all of which may be returned to the user, e.g., to client device 50, or other memory storage device.

The user may prefer to keep indexing and searching at their premises (using their own search engine). In this case, at S114, the query 14 may be returned to a user for review and possible modification by the user. In this case, access to the document collection 32 to be searched may be possible at retrieval time only via the user's search engine 36. Or the user may be provided with the opportunity to review and revise the translated query 14 before it is input to the search engine 34.

The method ends at S116.

Aspects of the system and method will now be described in further detail.

The Machine Translation System

The decoder 58 used in S106 can be any conventional machine translation system, such as one which includes or accesses a translation scoring model (TSM) 60 which has been trained, on a conventional parallel corpus of text documents in the source and target languages, to output a translation of new source text in the target language. The exemplary text documents used in training the decoder 58 are predominantly not in the form of queries, i.e., are complete sentences in conventional text comprising a large number of such sentences, e.g., in paragraph format.

In the illustrated embodiment, the trained phrase-based SMT system 58 receives the input query 12 and tokenizes it, i.e., identifies a sequence of tokens. These tokens are the source language words and other tokens, such as numbers and punctuation, which make up the text string of the input query 12. The decoder 58 has access to the biphrase library, 62, e.g., stored in memory 22, which includes pairs of phrases (biphrases) which have been automatically determined to be a translation of each other (based on automatic processing of the parallel corpus of text documents). In decoding the input query 12, the decoder 58 may retrieve a large number of such biphrases from the library 62 which cover one or more of the source words of the query 12, including, for example, the biphrases (préparatifs, preparations) and (préparatifs de mariage, marriage preparations) in the case of the exemplary query: préparatifs de marriage, shown in FIG. 1. Each of the retrieved biphrases thus includes one or more of the source words in query 12 and includes one or more corresponding words in the target language.

The decoder 58 uses the translation scoring model 60 to rank combinations of these retrieved biphrases to find a combination in which each word of the source query 12 is covered by no more than one of the biphrases. Some words or other tokens may not be recognized in the library 62 and are thus not covered by any of the biphrases. These unrecognized tokens may thus be preserved in their original format in the candidate query 64.

Since there are generally many different biphrase combinations, the decoder 58 is able to output a set of candidate queries 64 in the target language which are ranked highly by the translation scoring model 60. In normal operation the decoder 58 would output only the most highly ranked one as the translation. However, in the exemplary embodiment, the decoder outputs an Nbest list (a set of the highest scoring translations, as determined, for example, with the TSM). For example, the top 100 (or more) candidate queries 64 of the query 12 are output, such as at least 200 candidate queries, or more. There is no specific limit for the maximum number of candidate queries that are output and it can be up to 10,000, or more. In the exemplary embodiment, a maximum of about 1000 candidate queries is output for each input query. Of course, if the query 12 is short, the SMT system 58 may output fewer candidate queries than the preset maximum, and in rare cases, as few as one candidate query, e.g., if there is only one bi-phrase which covers the input query. However, in general, the SMT system is able to output a plurality of candidate queries 64, and for most queries 12, at least 10 candidate queries are output to the reranking component 66.

As will be appreciated from the description below, the same translation procedure as described above can be used in the training the reranking component (S102), although in that case, the decoder 58 is applied to training queries in the source language.

In the following examples, the Moses SMT system is used as the decoder 58 in S106 (see http://www.statmt.org/moses/ and Koehn, et al., "Moses: open source toolkit for statistical machine translation," in Proc. 45th Annual Meeting of the ACL, demonstration session, pp. 177-180, Prague, Czech Republic (2007)). However, it is to be appreciated that other SMT systems may be used, such as the phrase based machine translation systems disclosed, for example, in the following patents and applications, the disclosures of which are incorporated herein in their entireties, by reference: U.S. Pat. No. 6,182,026 entitled METHOD AND DEVICE FOR TRANSLATING A SOURCE TEXT INTO A TARGET USING MODELING AND DYNAMIC PROGRAMMING, by Tillmann, et al., U.S. Pub. No. 2004/0024581 entitled STATISTICAL MACHINE TRANSLATION, by Koehn, et al., U.S. Pub. No. 2004/0030551 entitled PHRASE TO PHRASE JOINT PROBABILITY MODEL FOR STATISTICAL MACHINE TRANSLATION, by Marcu, et al., U.S. Pub. No. 2008/0300857, published Dec. 4, 2008, entitled METHOD FOR ALIGNING SENTENCES AT THE WORD LEVEL ENFORCING SELECTIVE CONTIGUITY CONSTRAINTS, by Madalina Barbaiani, et al.; U.S. Pub. No. 2006/0190241, published Aug. 24, 2006, entitled APPARATUS AND METHODS FOR ALIGNING WORDS IN BILINGUAL SENTENCES, by Cyril Goutte, et al.; U.S. Pub. No. 2007/150257, published Jun. 28, 2007, entitled MACHINE TRANSLATION USING NON-CONTIGUOUS FRAGMENTS OF TEXT, by Nicola Cancedda, et al.; U.S. Pub. No. 2007/0265825, published Nov. 15, 2007, entitled MACHINE TRANSLATION USING ELASTIC CHUNKS, by Nicola Cancedda, et al.; U.S. application Ser. No. 12/690,504, filed on Jan. 1, 2010, entitled STATISTICAL MACHINE TRANSLATION SYSTEM AND METHOD FOR TRANSLATION OF TEXT INTO LANGUAGES WHICH PRODUCE CLOSED COMPOUND WORDS, by Sara Stymne, et al.; U.S. application Ser. No. 12/814,657, filed on Jun. 14, 2010, entitled WORD ALIGNMENT METHOD AND SYSTEM FOR IMPROVED VOCABULARY COVERAGE IN STATISTICAL MACHINE TRANSLATION, by Gregory Hanneman, et al. U.S. application Ser. No. 12/911,252, filed on Oct. 25, 2010, entitled MACHINE TRANSLATION USING OVERLAPPING BIPHRASE ALIGNMENTS AND SAMPLING, by Benjamin Roth, et al., Simard, et al., "Translating with non-contiguous phrases," in Proc. Conf. on Human Language Technology and Empirical Methods in Natural Language Processing, pp. 755-762, Vancouver, British Columbia, Canada (2005)), and combinations thereof. Methods for building libraries of parallel corpora from which bilingual dictionaries, such as library 62 can be generated are disclosed, for example, in U.S. Pub No. 2008/0262826, published Oct. 23, 2008, entitled METHOD FOR BUILDING PARALLEL CORPORA, by Francois Pacull, the disclosure of which is incorporated by reference in its entirety.

Figure 4:
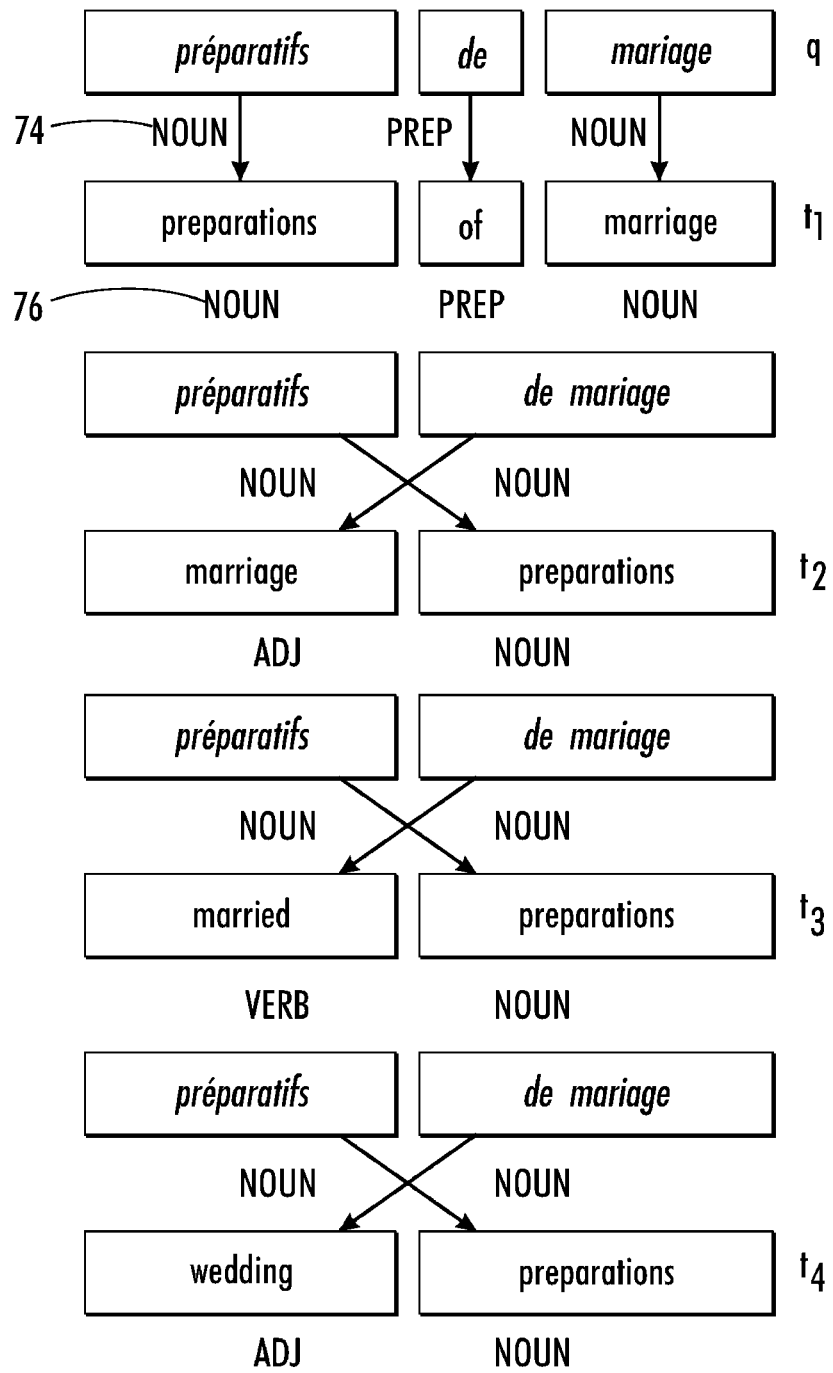
FIG. 4 illustrates example translation pairs used in training of the reranking component.

FIG. 4 illustrates a set of candidate queries (translations) 64 from the example query q as $t_1$, $t_2$, $t_3$, and $t_4$, for illustration purposes. In the output of the SMT system 58, an alignment may be provided (shown by the arrows between words) in each translation pair (q, $t_1$), (q, $t_2$), etc. The alignment indicates which element (word(s)) of the query q is aligned with which element (word(s)) of the candidate query t in the translation pair. Thus, for example, the decoder 58 indicates, for translation pair q,$t_1$, that the first word of the query préparatifs is aligned with the first word of the candidate query preparations. The decoder 58 may also provide parts-of-speech (POS) 74, 76, etc. for each of the words in each translation pair. Thus, for example, the pair of elements préparatifs, preparations is labeled with (NOUN, NOUN). In other embodiments, a separate component provides the POS labeling. More complex POS labeling is also contemplated. For example, a parser may be used to identify dependencies between words and these may be incorporated into the POS, such as subject-object dependencies, heads of noun phrases, and the like.

These POS labels are used in computing features, as described in greater detail below.

Learning Weights (S102)

In the exemplary embodiment, the feature weights Λ are learned in S102 to optimize retrieval performance on the training set, e.g., to optimize an overall retrieval score, such as the Retrieval Mean Average Precision (MAP), on translated queries. The average precision, for a candidate query, can be computed as the retrieval precision, optionally taking into account the rank of the relevant documents for each query. In the exemplary embodiment, a simple binary rank is used for the top retrieved documents, i.e., relevant or not relevant to the query, however, it is to be appreciated that more refined ranking scheme may be used.

The learning involves the presence of a labeled training set 26 where a retrieval score, such as the average retrieval precision AP, for each translation of each source query is available. For example, at training time, both access to a document collection 70 and the presence of relevance annotations for the queries of the training set are available. For example, each document in collection 70 includes an annotation indicating to which of the training queries it is relevant. Once the feature weights 26 for the reranking model 24 are learned, the model can be reused for query translation independently of the annotated document collection 70.

Figure 5:
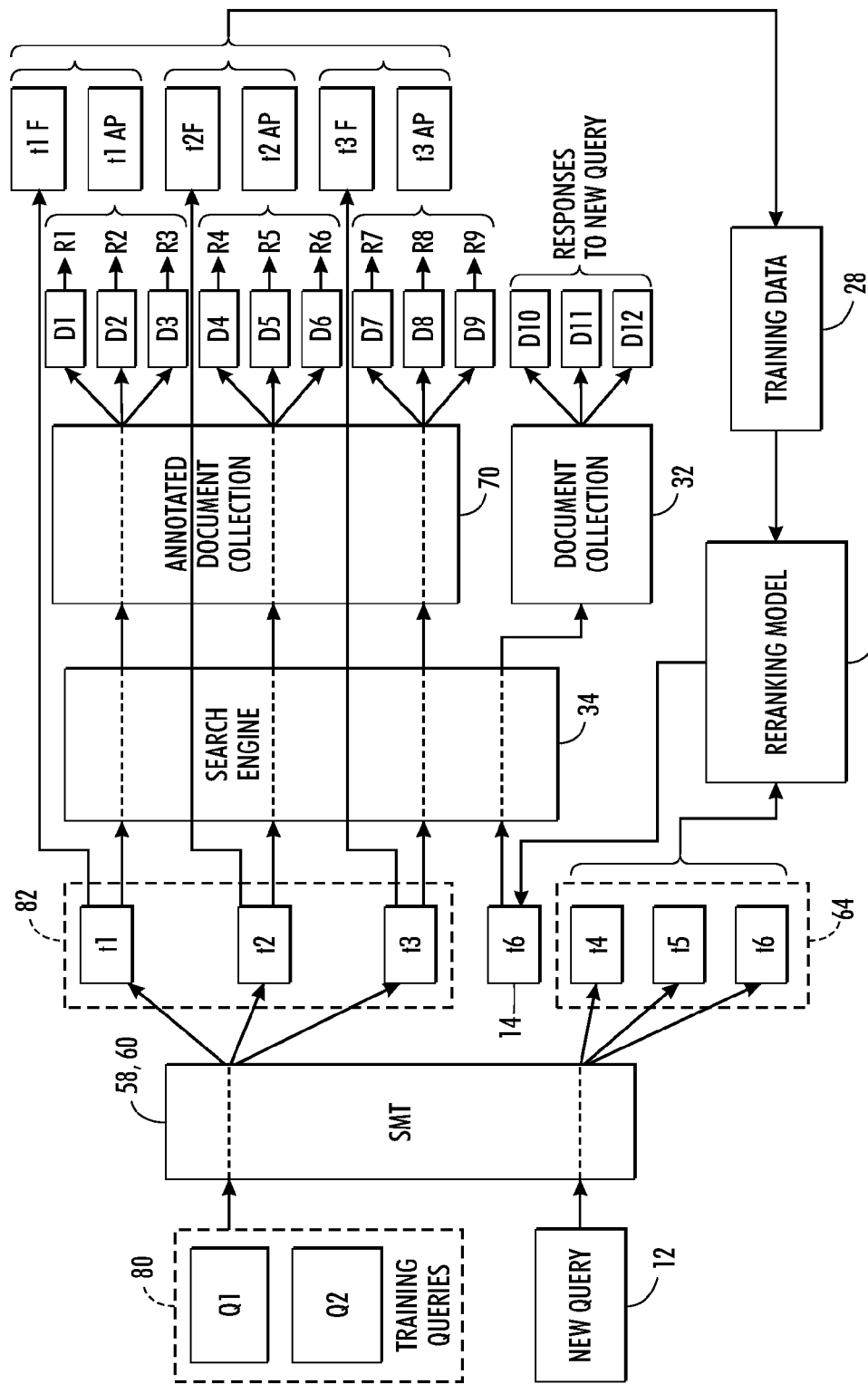
FIG. 5 graphically illustrates various elements of the system and method.

With reference to FIGS. 4 and 5, the learning of the weights may proceed as follows. At S200, a set 80 of training queries (Q1, Q2, etc.) is provided. The training queries (original queries) 80 are queries in the source language, as for the input query 12, e.g., generally of ten (10) words or less. At S202, an annotated collection of target language documents 70 may be provided. These are documents which are labeled according to their responsiveness to each training query in the set 80.

In one embodiment, a pre-generated dataset, e.g., a parallel dataset of queries in source and target languages can be used to provide the training queries and annotated documents in S200 and S202. One such dataset can be generated from the AdHoc-main, AdHoc-TEL and/or GeoCLEF tracks of one or more years of the CLEF challenge data (see, World Wide Web at clef-campaign.org/). Each track contains about 50 multilingual queries, which are referred to as "topics". A large number, e.g. several hundred, of these parallel topics can then be used for training of the reranking component 66. As will be appreciated, only the source topics in the language of interest are needed as the training queries, however, the target topics can be used to evaluate the relevance of the retrieved documents, in some embodiments. Each query has been manually labeled with a reference to documents in the training corpus 70 that are responsive to it. In practice, the human annotations for the documents in the training corpus 70 need not be provided for all the documents, but only for a representative subset of documents. For further details on the annotation process, see "What happened in CLEF 2009. Introduction to the Working Notes" by Carol Peters, available on the world wide web at clef-campaign.org/2009/working_notes/CLEF2009WN-Contents.html.

An advantage of using such training data 28 is that it has been prepared so that new SMT systems can be evaluated against each other and the documents retrieved are already labeled according to responsiveness to the training query. However, such data may not be available for the source/target language pair or even suitable. For example, when the type of queries or document collection to be queried are for a specific domain, it may be more appropriate to train the reranking component on a domain-specific annotated document collection 70, which may be generated from collection 32, e.g., with documents provided by or selected by the client. The training queries 80 may alternatively or additionally be generated manually or may be automatically acquired from a system which receives queries from a variety of users for the collection 32.

Given the training set 80 of training queries and annotated documents 70, training data 28 for the reranking model training may then be generated, as follows:

At S204, a set 82 of translations (t1, t2, t3, etc.) is produced by the SMT system 58 for each source topic (i.e., for each training query Q1, S2, Q3, etc.). For example, at least 100 or 200, e.g., about 1000 translations are generated for each training query, in the same way as described above for the input query 12.

At S206, for each translation (t1, t2, t3, etc.) of each training query features examples of which are described below, are computed, to provide a respective features representation (t1F, t2F, t3F). This may include determining a value for each of a predefined set of features. In the exemplary embodiment, at least some of the features rely on the alignments produced by the SMT system 58 (e.g., Moses baseline system), as illustrated in FIG. 4. A features vector which includes a value for each of the predetermined set of features can thus be generated for each translation.

At S208, each translation (t1, t2, t3, etc.) of each topic is used to perform retrieval from the annotated document collection 70 in the target language. Any suitable search engine 34 can be used for this purpose, such as the lemur toolkit (see the World Wide Web at lemurproject.org/).

At S210, the documents (D1, D2, D3, D4, D5, D5, D7, D8, D9, etc.) retrieved by the search engine from collection 70, using the translations (t1, t2, t3, etc.) as queries, are then each assigned a relevance score (R1, R2, R3, R4, R5, R5, R7, R8, R9, etc). In one embodiment, this can be performed manually, by comparing the retrieved document to the original training query and determining if it is relevant or not (e.g., assigning a 0 for not relevant and a 1 for relevant). In another embodiment, a human experienced translator translates the original source training query into the target language to generate a reference query (i.e., a query in the target language which has been translated by a means other than the SMT system 10). The relevance (R1, R2, R3, R4, R5, R5, R7, R8, R9, etc) can then be manually assessed with reference to the reference query. In the exemplary embodiment, this can be achieved with the relevance annotations provided during a corresponding CLEF campaign. For example, the documents in the collection 70 are already labeled with an indication of whether or not they are relevant to each particular topic (training query in the target language) and this information can be used to assign the relevance scores to the retrieved documents.

Then, at S212, each translation (t1, t2, t3, etc.) receives a corresponding precision score (t1AP, t2AP, t3AP, etc.) based on the relevance scores of each of the retrieved documents in the set. For example, the top n (e.g., n=20) documents retrieved by the search 34 engine for each translation are considered in computing a measure of retrieval performance (e.g., the Average Precision, AP). In one embodiment, the rank is not considered in computing the precision score AP. For example, if 5 of the n documents retrieved in response to translation t1 are annotated as "relevant" to the original training query q, then the average precision AP for this translation t1 is computed as 5/20=0.25. In other embodiments, the rank of each retrieved document is taken into account. For example, the top document retrieved is given the highest rank, with a rank score of, for example 20, and the remaining 19 documents are each ranked with sequentially decreasing rank scores, in order. The average precision AP is then the sum of the rank scores multiplied by the respective relevance scores. The features and corresponding precision score AP for each translation form the training data 28 which, for each query Q1, Q2, etc. is used to train the reranking model 67.

At S214, the feature weights Λ for the model 67 are learned based on the feature vectors computed at S206 and the AP scores of the translations computed at S212. In the exemplary embodiment, the learning is performed with the objective of maximizing the average precision over all the topics (training queries) of the training set. Any suitable machine learning method can be used for this purpose, such as Structured perceptron based methods, Kernel-based learning methods, neural networks, and the like. One suitable algorithm is the margin infused relaxed algorithm (MIRA), an extension of the perceptron algorithm, which is suited to multi-class problems. This algorithm can learn a set of parameters (here, the feature weights of the vector) by processing all the given training examples one-by-one and updating the feature weights with each training example, so that the current training example is classified correctly with a margin against incorrect classifications at least as large as their loss. The change of the feature weights in each iteration is generally to be kept as small as possible. Such an update is done for each translation, and several iterations are possible through the whole training set. For further details on the MIRA algorithm, see Crammer et al., "Ultraconservative Online Algorithms for Multiclass Problems," in *J. Machine Learning Res.*, 3, 951-991 (2003). As an example, an implementation of MIRA proposed by Chiang et al., "Online large-margin training of syntactic and structural translation features," in *Proc. Conf. on Empirical Methods in Natural Language Processing* (EMNLP '08); Association for Computational Linguistics, Stroudsburg, Pa., USA, pp. 224-233 (2008), can be used.

The feature weights Λ are learned so that the best translations of the queries (those with the highest AP) are ranked higher on average, by the reranking component, than those with lower AP scores. In one embodiment, the feature weights Λ are learned in S214 to optimize the Retrieval Mean Average Precision (MAP) on the training set. The MAP score is simply the mean value of all AP scores. In one exemplary embodiment, the average of all the parameters (voting version) is used. In this embodiment, the averages of each of the weights generated through all the iterations are taken as the feature weights Λ. Thus, the weights bringing more translations higher in the list have more impact on the average score. This makes the algorithm more robust. In one embodiment, the weights which, on average would minimize the number of retrieval errors on the training set (which is not necessarily maximization of the MAP score, but it improves the final MAP score in practice) is used. As will be appreciated, in other embodiments, the weights learned after a number of iterations of the algorithm or at a point when improvements in the retrieval are no longer significant can be used.

Thus, for example, assume a translation t3 under consideration has a features vector (1,0,1,0,1,1,1,0,0,1) for ten example features and the feature weights (e.g., normalized to add to 1) are currently all set at 0.1 (just for illustration only), then its translation score, based on Eqn. 1, is 0.6. This translation should therefore have an AP score t3AP which is higher than that of a previous translation t1 with a translation score which is lower than 0.6 and/or an AP score which is lower than a previous translation t2 with a translation score which is higher than 0.6. If not, the weights Λ in the model can be adjusted. This process is then continued with additional training data 28. The parameters of the model 67, in particular, the weights Λ (e.g., the average weights from all iterations), are then frozen.

The reranking model 67 is thus trained to predict a precision score AP for each new translation (t4, t5, t6) output by an SMT system (such as decoder 58 or different SMT system), based on its features vector. The reranking component 66 can then select, from the set of translations (t4, t5, t6) of a new query 12, the one(s) (t6 in this example) having the highest predicted precision score AP.

Features

The features whose values are used in Eqn. 1 can be any suitable features which can be extracted from a translation pair (a query and its translation), i.e., an input query and/or its candidate query or a training query and its translated query).

Exemplary features which may be used herein may include any of those used in the translation scoring model (TSM) 60 of the SMT system. For example, these may include dependency-based features, such as syntactic dependencies in the candidate query and/or features used in the TSM. Features of the Moses TSM 60 which can be used as features in the reranking include lexical (word) and phrasal translation probabilities (probability of a source word/phrase knowing the target word/phrase, and vice versa), language model features (frequencies of n-grams, such as trigrams, in the translation), and a distortion feature which represents the degree of reordering between the words in the source string and the corresponding words in the target string. In the exemplary embodiment, a subset of the Moses SMT baseline features is used (MOSES). These include only the translation model features that deal with lexical (word) and phrasal probabilities.

Additionally or alternatively, one or more syntactically motivated features may be employed. These are based on the PoS correspondence between source query and its translation. Two features of this type are given by way of example: POS and LEX, which are not among the Moses baseline features. These features may be computed as follows: in a translation pair output by the SMT system, each element (word or short phrase) 70 in the query is aligned with a corresponding element (word or short phrase) 72 in the translation, as illustrated in FIG. 3. The elements are also labeled with PoS tags. PoS tags can be selected for example from a finite set, e.g., the set: verbs, nouns, pronouns, adverbs, adjectives, prepositions, conjunctions, and determiners, or variants thereof. One feature is based on the PoS tags of aligned pairs of elements, on element in the source q and the other in the target t. In the case where multiple (e.g., two or more) words in the source side are aligned with one target word, a part of speech pair can be extracted for each pair of source word and same target word (and vice versa). A feature can be introduced for each pair of aligned elements, i.e., each pair of aligned PoS tags (based on word alignments produced by Moses) in the training set. For example, in the French query: Préparatifs (NOUN) de marriage (NOUN) may be translated in English as married (VERB) preparations (NOUN), as in $t_3$ shown in FIG. 3, where Préparatifs is aligned with preparations and de marriage with married. The two features introduced for this example will be: f_noun-noun and f_noun-verb.

The number of occurrences of each of these features in the translation pair can be counted to provide a first set of feature values: POS. For example, the system counts, for each candidate query, a number of occurrences of each specific pair of PoS tags (f_noun-noun=1 and f_noun-verb=1, and f_verb-noun=0, for example, in the above example).

Another feature, LEX weights the generic PoS map feature by a lexical alignment score $p_f$(préparatifs|preparations) or $p_r$ (preparations|préparatifs). The lexical alignment score $p_f$ or $p_r$ may be retrieved from the biphrase library 62 as the frequency of occurrence of the second term as a translation of the first in the parallel training corpus of aligned sentences. Thus for example, if préparatifs is translated as preparations in 50% of all occurrences in the training corpus and (f_noun-noun)=1 for the translation pair, then the value of the LEX feature (f_noun-noun) $p_f$=1×0.5=0.5.

The vector of all possible PoS pairs could be relatively large (e.g., when there is one feature for each of all possible combinations of eight different parts of speech) and sparse, particularly in the case of a relatively small training set of training queries (e.g., about 400 examples). Thus, to avoid overfitting, only the PoS tag pairs which are above a certain frequency threshold in the training corpus may be considered. For example, only the top about 20 (e.g., 21) of the possible PoS tag pairs are considered to compute the POS and LEX features. This gives a feature vector of about 40 values for the two features, which when added to the features selected from the baseline Moses system provides a features vector with a manageable number of values.

Other features which can be used are syntactic coupling features. Features of this type are described in Nikoulina, V. and Dymetman, M., "Experiments in discriminating phrase-based translations on the basis of syntactic coupling features," in *Proc. 2nd Workshop on Syntax and Structure in Statistical Translation* (SSST '08), pp. 55-60, David Chiang and Dekai Wu (Eds.). Association for Computational Linguistics, Stroudsburg, Pa. (2008) and. These coupling features are based on the syntactic dependencies between pairs of respective words which are aligned in the respective query/translated query. To make use of this type of feature, a parser for each of the languages is used to extract the syntactic dependencies. A suitable parser is the Xerox Incremental Parser (XIP). Then, for each set of combinations (q', q", t', t"), feature values can be computed based on a syntactic dependency, if any, between q' and q" and between t' and t", where q' and q" are elements from q that are aligned with elements t' and t" from t, respectively. Thus, for example, in the second pair shown in FIG. 5, préparatifs in q is in a MODIFIER type syntactic dependency with the element, de marriage, and in the translation $t_2$, preparations, which is aligned with préparatifs is also in a MODIFIER type of dependency with the element marriage that is aligned with de marriage, thus, the dependency pair (coupling feature) MOD,MOD could be extracted. This pair of dependencies can thus be assigned a feature value which can be summed over all such dependencies in the pair. In other pairs of q and t, the dependency pair(s) may be different (see, for example, the third pair, $q, t_3$).

Other features which can be used include language model features, such as frequencies of particular n-grams. As will be appreciated, in the learning of the weights for the features, those features which correlate less well with retrieval performance are accorded less weight. By reviewing the set of feature weights in the trained model, those features with weights which are below a threshold value can be identified and optionally dropped from the model.

Translation Scoring (S110)

In the exemplary embodiment, the optimum translation (query candidate) is the one which maximizes the translation score, over all translations $t_i$ in set 64. As noted above, the translation score is a weighted function of the features computed for the candidate query and can be defined as a weighted linear combination of the values of the features as for Eqn. 1 above.

It is to be appreciated that the terms "optimum" and "maximization," and similar phraseology are to be broadly construed, herein, as one of ordinary skill in the art would understand these terms. For example, these terms are not to be construed as being limited to the absolute global optimum value. For example, maximization of a function may employ an iterative maximization algorithm that terminates at a stopping criterion before an absolute maximum is reached.

In the exemplary embodiment, however, the scoring function is simply a dot product in which each feature value is simply weighted by its appropriate weight and the weighted feature values are summed. The candidate query, or set of candidate queries, producing the highest score are output. As will be appreciated, there may be further processing of the queries before being output to a user An advantage of the exemplary reranking approach is that it allows optimizing the reranking model towards an information retrieval (IR) score. Moreover, as the average query length is typically about 5 words, this allows obtaining much more diversity in the Nbest list of candidate translations than in the case of general phrase translation, where the average length of each source string is about 25 words.

Figure 3:
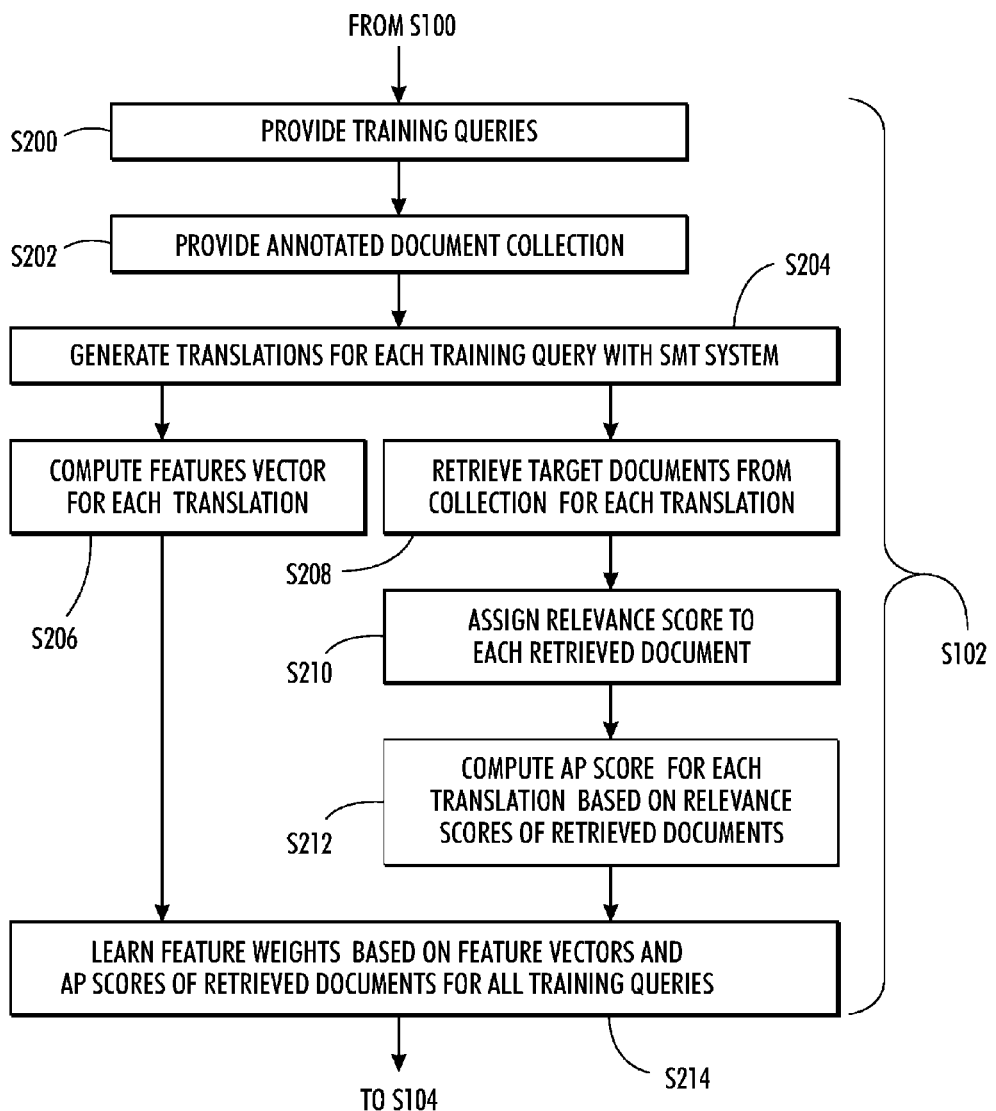
FIG. 3 is a flow chart illustrating an exemplary method for training a reranking component for the query translation method of FIG. 2, in accordance with another aspect of the exemplary embodiment.

The method illustrated in FIGS. 2 and 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 2 and 3, can be used to implement the query translation method.

The exemplary system and method enable a general SMT system to be adapted for query translation by using the reranking framework. The approach allows performing parameter optimization by maximizing the IR score for a training set and thus integrating query translation and retrieval in the same framework. At the same time, this approach keeps the query translation at the test time independent of any document indexing. This feature makes it well-adapted to query translation services and especially to cases in which accessing the document collection at retrieval time, by the service, is not possible. The access to a document collection for creating a training set can be replaced by an annotated training set produced by a content provider wishing to adapt the MT system to its needs.

The reranking framework allows for a lot of flexibility in enriching the baseline translation model with new, more complex features. The approach also enables the optimization to be performed towards a goal function adapted for the purposes (an IR-based score).

This approach can be adapted for other tasks, like domain adaptation for example. Possible features include: 1-gram in-domain language model, lexical probabilities learned on in-domain parallel or comparable corpora, etc.

Without intending to limit the scope of the exemplary embodiment, the following examples demonstrate the applicability of the method.

EXAMPLES

As an SMT system, the Moses baseline system was trained on a parallel corpus of bi-sentences (French-English Europarl). Training data 28 for training the reranking model was generated from the AdHoc-main, AdHoc-TEL and GeoCLEF tracks of CLEF 2001-2008. A total of 400 parallel topics for the French-English language pair was extracted from this data. For testing the trained system, the CLEF AdHoc-TEL 2009 task (50 topics) was used. These queries were translated with the trained Moses baseline system and the translated queries assigned an AP score, based on the retrieval scores of the documents retrieved.

As features for the reranking model, the following groups of features were evaluated:

MOSES: a subset of Moses baseline features (only the translation model features that deal with lexical or phrasal probabilities).

MOSES+POS: the MOSES features above enriched with POS features (for the top 21 POS features).

MOSES+LEX: the MOSES features above enriched with LEX features (for the top 21 POS features).

MOSES+POS+LEX: the MOSES features above enriched with POS and LEX features (for the top 21 POS features).

The baseline mean average precision (MAP) scores for the SMT system, without reranking, are given in Table 1.

TABLE 1

| Monolingual IR | MAP | Bilingual IR | 1best MAP | 5best MAP |
| --- | --- | --- | --- | --- |
| English | 0.3159 | French-English | 0.1744 | 0.2199 |

The monolingual retrieval was done with the lemur toolkit, using the English queries. The French-English MAP scores are computed after performing translation of French queries to English and a monolingual retrieval with either the best translation or a concatenation of the 5 best translations proposed by the Moses baseline model (trained on Europarl). The monolingual retrieval results can thus be considered as the goal for the present system.

Results

Figure 6:
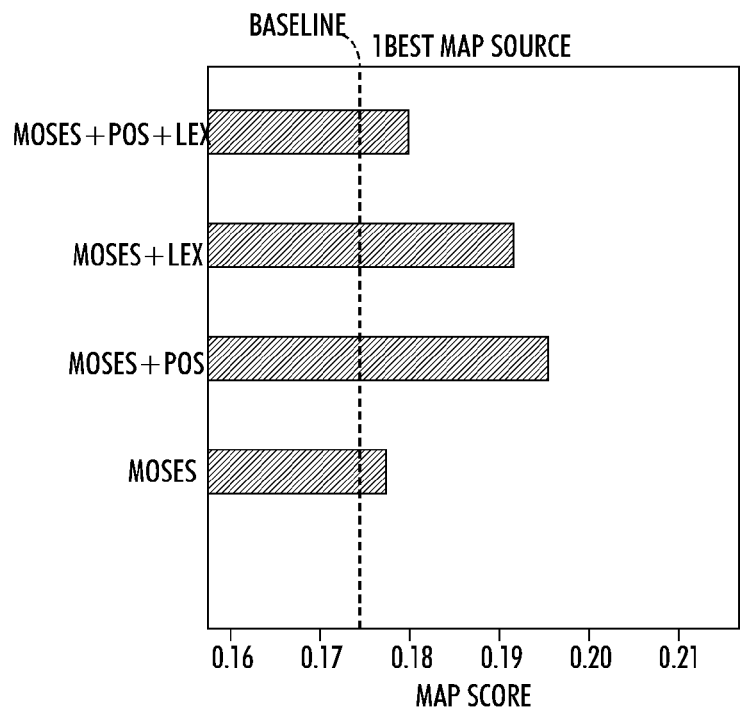
FIGS. 6 and 7 illustrate results of the exemplary method using different reranking models for 1 best and 5 best translations.
Figure 7:
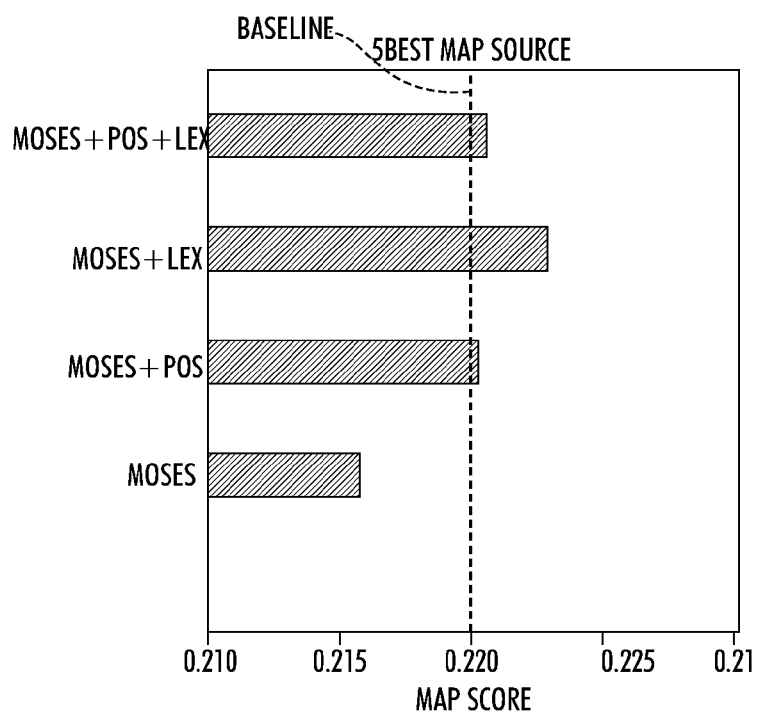

The results of reranking with the different models are illustrated in FIGS. 6 and 7. These results show that the exemplary method can improve the cross-lingual retrieval quality by choosing more appropriate translations from an existing list with an adapted model. Improvements in MAP over the baseline MAP score are generally observed for both the 1 best and 5 best cases (i.e., when taking a single best translation or concatenating 5 best translations proposed by the corresponding reranking model, is performed). The only exception is for the MOSES model in the 5 best case, which may be a function of the sparsity of the training data 28.

While reranking has been attempted in other contexts, like parsing (Collins, M., "Discriminative training methods for hidden Markov models: theory and experiments with perceptron algorithms," in EMNLP '02, Vol. 10., pp. 1-8, ACL 2002), Machine Translation (Och, et al., "Syntax for Statistical Machine Translation: Final report of John Hopkins 2003 Summer Workshop, Technical report, Johns Hopkins University, 2003, and Nikoulina and Dymetman 2008), and language modeling (Collins, et al., "Discriminative syntactic language modeling for speech recognition," in ACL '05, pp. 507-514, 2005), it has not been shown to be particularly effective. In the past, the reranking framework was used to combine generative and discriminative methods when both approaches aim at solving the same problem: the generative model produces a set of hypotheses, and the best hypothesis is chosen afterwards via the discriminative reranking model, which allows the baseline model to be enriched with the new complex and heterogeneous features. In the present system, however, the reranking is aimed at optimizing a machine translation system for Cross-lingual Information Retrieval by maximizing the IR score on the training data. In this context, the reranking framework not only allows enriching the baseline translation model but also performs training using a more appropriate evaluation metric.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A translation method comprising:
receiving an input query in a source language; and
outputting a target query, the target query being identified from a set of candidate target queries, each target query being based on a translation of the input query into a target language, different from the source language, with a machine translation system which includes a reranking model for ranking the candidate target queries, which has been trained by a method which includes:
  for each of a plurality of training queries in the source language, translating the training query in the source language into the target language to generate translated queries which are each a translation of the respective training query;
  for each of the translated queries:
    computing a feature representation of the translated query;
    retrieving a set of annotated documents from a document collection in response to the translated query, the documents in the retrieved set of annotated documents including annotations that are based on responsiveness of each of the documents to each of the training queries, and
    computing a precision score for the translated query based on relevance scores of the retrieved documents in the set of annotated documents, each of the relevance scores being based on the annotations of the documents in the retrieved set of annotated documents; and
  learning feature weights for the reranking model based on the precision scores and feature representations of the translated queries.

2. The method of claim 1, wherein the machine translation system is implemented with a computer processor.

3. The method of claim 1, wherein the outputting comprises outputting the target query to a search engine and retrieving information based on the target query.

4. The method of claim 1, wherein the outputting of the target query comprises, for each of a set of candidate queries generated by the machine translation system as a translation of the input query in the target language, generating a features vector based on features extracted from the candidate query.

5. The method of claim 1, wherein the information retrieval performance of each translated query is determined with respect to at least one of the training query and a reference translation thereof in the target language.

6. The method of claim 1, wherein the method includes training the machine translation system.

7. The method of claim 1, wherein the learning of the feature weights is performed with a margin infused relaxed algorithm.

8. The method of claim 1, wherein at least one of the features is a feature which is not used in generating the translation of the input query.

9. The method of claim 1, wherein the outputting comprises:
translating the input query with a decoder of the machine translation system to generate a set of candidate queries in the target language;
extracting features for each of the candidate queries in the set; and
ranking the candidate queries based on a representation of the extracted features for each candidate query and feature weights for the features in the reranking model.

10. The method of claim 9, wherein the ranking comprises computing a function of the extracted features and the learned feature weights for the features.

11. The method of claim 10, wherein the computing of the function comprises computing a translation score for each of the candidate queries as a weighted linear combination of its extracted features.

12. The method of claim 11, wherein the method includes outputting, as the target query, a candidate query which satisfies:

$$\hat{t} = \mathrm{argmax}_{t_i \in GEN(q)} \Lambda \cdot F(t_i) \quad \text{(Eqn. 1)}$$

where $t_i \epsilon (GEN(q))$ represents a candidate query generated from a source query q, $\Lambda$ represents a set of feature weights learned in training, one weight for each of the features in $F(t_i)$ and $\cdot$ represents the dot product.

13. The method of claim 9, wherein at least one of the extracted features is based on parts of speech for the candidate queries.

14. The method of claim 13, wherein at least one of the part of speech features is based on a part of speech for an element of the candidate query and a corresponding part of speech of an element of the input query with which the element of the candidate query is aligned in the translation, wherein each of the elements comprises at least one word.

15. The method of claim 14, wherein the at least one of the part of speech features is also based on a frequency of the element in the candidate query as a translation of element of the input query in a training corpus of bi-sentences, each bi-sentence including a sentence in the source language and a sentence in the target language.

16. The method of claim 9, wherein the outputting of the target query comprises outputting a most highly ranked candidate query as the target query or outputting a combination of more highly ranked candidate queries as the target query.

17. The method of claim 9, wherein the translating of the input query with the machine translation system comprises:
retrieving a set of biphrases, each biphrase comprising at least one word of the input query in the source language and at least one corresponding word in the target language; and
with a scoring function, computing a set of the retrieved biphrases to cover the input query, for each of the set of candidate queries, each candidate query comprising the corresponding words in the target language forming the set of retrieved biphrases.

18. A computer program product comprising a non-transitory computer-readable recording medium which stores instructions for performing the method of claim 1.

19. A translation system comprising non-transitory memory which stores instructions for performing the method of claim 1 and a processor in communication with the memory for executing the instructions.

20. A query translation system comprising:
a decoder which receives a source query in a source language and outputs a set of candidate queries in a target language, each of the candidate queries being a translation of the same source query;
a reranking module which outputs a target query based on at least one of the candidate queries, the reranking module extracting features of each of the candidate queries and computing a function in which the extracted features are weighted by feature weights, the feature weights having been learned on features of each of a set of translated queries generated by translation of each of a set of training queries into the target language and a precision score computed for each of the translated queries, the computing of the precision for each of the translated queries including retrieving a set of annotated documents from a document collection in response to the translated query, the documents in the retrieved set of annotated documents including annotations that are based on responsiveness of each of the documents to each of the training queries, and computing the precision score for the translated query based on relevance scores of the retrieved documents in the set of annotated documents, each of the relevance scores being based on the annotations of the documents in the retrieved set of annotated documents; and
a processor which implements the reranking module.

21. The query translation system of claim 20, wherein the decoder comprises a phrase-based statistical machine translation system, each of the candidate queries being a translation of the same source query generated by retrieving biphrases from a biphrase library, each retrieved biphrase comprising at least one word of the source query in the source language and at least one corresponding word in the target language, the decoder computing a set of the retrieved biphrases to cover the input query for each of the candidate queries, each candidate query comprising the corresponding words in the target language forming the respective set of retrieved biphrases.

22. A method for training a translation system for translation of queries, comprising:
for each of a plurality of training queries in a source language:
translating the training query to generate a set of translated queries in a target language;
for each translated query in the set of translated queries:
extracting values of features for each of a finite set of features;
retrieving a set of annotated documents from a document collection in response to the translated query, the documents in the retrieved set of annotated documents including annotations that are based on responsiveness of each of the documents to each of the training queries; and
computing a precision score for the translated query based on relevance scores of the retrieved documents in the set of annotated documents, each of the relevance scores being based on the annotations of the documents in the retrieved set of annotated documents;
learning feature weights for each of the features based on the extracted values of the features and the respective precision score of each translated query; and
storing the feature weights for use in translating a new query, different from each of the training queries, from the source language to the target language, whereby candidate translations of the new query are ranked based on their extracted values of features and the stored feature weights.

23. A computer program product comprising a non-transitory computer-readable recording medium which stores instructions for performing the method of claim 22.

24. A computer system comprising non-transitory memory which stores instructions for performing the method of claim 22 and a processor in communication with the memory for executing the instructions.

* * * * *